(12) United States Patent
Yoshioka (10) Patent No.: US 7,452,301 B2
(45) Date of Patent: Nov. 18, 2008

(54) EXTERNALLY ACTUATED TORQUE COUPLING FOR DRIVETRAIN

(75) Inventor: Jun Yoshioka, Canton, MI (US)

(73) Assignee: Dana Automotive Systems Group, LLC, Toledo, OH (US)

(*) Notice: Subject to any disclaimer, the term of this patent is extended or adjusted under 35 U.S.C. 154(b) by 212 days.

(21) Appl. No.: 11/354,078

(22) Filed: Feb. 15, 2006

(65) Prior Publication Data

US 2007/0191172 A1   Aug. 16, 2007

(51) Int. Cl.
*F16H 48/22*   (2006.01)
(52) U.S. Cl. ..................................... 475/231
(58) Field of Classification Search ............... 475/231
See application file for complete search history.

(56) References Cited

U.S. PATENT DOCUMENTS

| | | | |
|---|---|---|---|
| 3,749,217 A | 7/1973 | Bush et al. | |
| 5,145,329 A | 9/1992 | Zumbusch et al. | |
| 5,145,348 A | 9/1992 | Zumbusch | |
| 5,215,506 A * | 6/1993 | Hara | 475/86 |
| 5,467,596 A | 11/1995 | Yu | |
| 5,702,319 A | 12/1997 | Baxter, Jr. | |
| 5,860,884 A | 1/1999 | Jolliff | |
| 5,971,881 A | 10/1999 | Jolliff | |
| 6,059,680 A * | 5/2000 | Yoshioka | 475/88 |
| H1966 H | 6/2001 | Henry, IV et al. | |
| 6,250,445 B1 | 6/2001 | Davis | |
| 6,386,836 B1 | 5/2002 | Johnson | |
| 6,460,504 B1 | 10/2002 | Phillips et al. | |
| 6,461,267 B1 * | 10/2002 | Paielli | 475/150 |
| 6,733,411 B1 | 5/2004 | Kaplan et al. | |
| 6,808,053 B2 * | 10/2004 | Kirkwood et al. | 192/84.6 |
| 6,902,506 B2 * | 6/2005 | Schrand | 475/86 |
| 6,953,411 B2 * | 10/2005 | Burns et al. | 475/231 |
| 7,241,247 B1 * | 7/2007 | Hunt et al. | 475/231 |
| 2004/0071559 A1 | 4/2004 | Al et al. | |

* cited by examiner

Primary Examiner—Ha D. Ho
(74) Attorney, Agent, or Firm—Berenato, White & Stavish (57) ABSTRACT

A torque-coupling device comprising a hydraulically actuated friction clutch pack and a gerotor pump provided for generating hydraulic pressure actuating the friction clutch pack. The gerotor pump is selectively actuated by a device external to the gerotor pump and the friction clutch pack, such as an electric motor, friction brake, electro-magnetic clutch, friction mechanism utilizing a magneto-rheological fluid, electro-magnetic brake, etc. The externally driven gerotor pump may be further provided with torque-multiplication gearing, and/or an electronic controller to modulate the actuation of the pump in order to provide flexible control of the hydraulic pressure generated by the gerotor pump.

15 Claims, 7 Drawing Sheets

EXTERNALLY ACTUATED TORQUE COUPLING FOR DRIVETRAIN

BACKGROUND OF THE INVENTION

1. Field of the Invention

The present invention relates to hydraulic coupling assemblies for motor vehicles, and more particularly to a hydraulic coupling assembly having an external control for a hydraulic pump independent of the difference in rotation between two rotating components driving the hydraulic pump.

2. Description of the Prior Art

Many modern vehicles employ four-wheel drive systems. These systems have been marketed in two forms. Systems generally termed four-wheel drive (4WD) have a transfer case, which is controlled by the operator to select two wheel or four-wheel drive. If the operator selects the four-wheel drive condition, the vehicle drives all four wheels continuously. Some of these systems have employed overrunning clutches at two of the wheel to alleviate some of the disadvantages of 4WD which result from tire pressure differential and cornering to name a few.

All wheel drive (AWD) systems also provide the benefits of a four-wheel drive vehicle and do not require the operator to intentionally select this condition. These systems often employ a viscous clutch in the center differential to transfer torque to the drive wheels that are not sensed as slipping. In tight cornering situations and during towing, these AWD systems present a disadvantage. In cornering situations, noise and vibration can result from the AWD system being engaged. While this is not detrimental to the powertrain during short durations, it can be disconcerting to the operator.

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic couplings conventionally use a frictional clutch between the rotary members. The frictional clutch may be selectively actuated by various hydraulic actuator assemblies, which are constructed of elements disposed inside the differential casing. The hydraulic actuator assemblies internal to the differential case often include displacement pumps disposed inside the differential casing and actuated in response to a relative rotation between the differential case and the output shaft. The displacement pumps are usually in the form of internal gear pumps, such as gerotor pumps, adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch.

While known hydraulic couplings, including but not limited to those discussed above, have proven to be acceptable for various vehicular driveline applications, such devices are nevertheless susceptible to improvements that may enhance their performance and cost. With this in mind, a need exists to develop improved hydraulic couplings and driveline apparatuses that advance the art.

SUMMARY OF THE INVENTION

A torque coupling unit comprising an input member and at least one output member; a clutch assembly for selectively coupling the input member with the at least one output member; a normally deactivated hydraulic pump provided to generate a hydraulic pressure to frictionally load the clutch assembly; and a pump actuator for selectively actuating the hydraulic pump, said pump actuator disposed externally to the clutch assembly.

DETAILED DESCRIPTION OF THE PREFERRED EMBODIMENT

Figure 1:
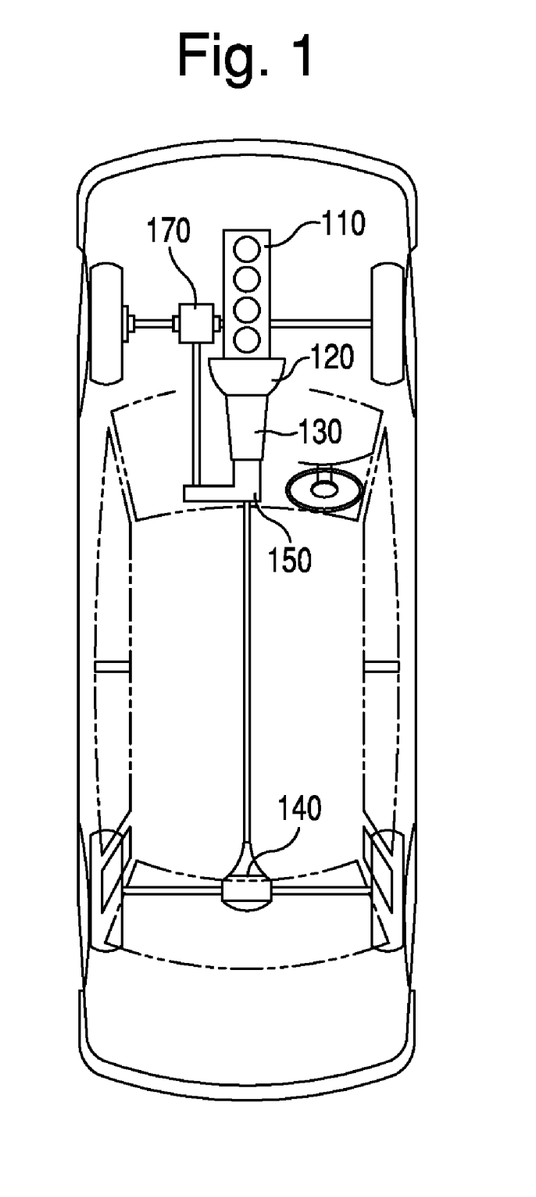
FIG. 1 is a schematic view of a four-wheel-drive vehicle incorporating the torque coupling assembly of this invention.

With reference to FIG. 1, the four-wheel-drive vehicle provided in accordance with the present invention comprises an engine 110, a transmission 130 which is driven through a clutch 120 by the engine 110 to change the speed of the output rotation of the engine 110. A transfer case 150 divides torque transmission between a first differential 140 that drives one of a front and a rear wheel systems and a second differential 170 that drives the other of the front and the rear wheel systems.

In accordance with one aspect of this invention, a torque transmission coupling is provided between a ring gear and a planetary differential housing. The torque transmission coupling comprises an oil pump that is driven by the relative rotation between the ring gear sub-assembly and a planetary gear set sub-assembly to generate oil pressure corresponding to the speed of the relative rotation. A friction clutch mechanism engages the ring gear sub-assembly and the differential gear set sub-assembly with each other by the oil pressure generated by the oil pump. The torque transmission coupling has such a property that the torque transmitted by the coupling is proportional to the speed of the relative rotation.

Figure 2:
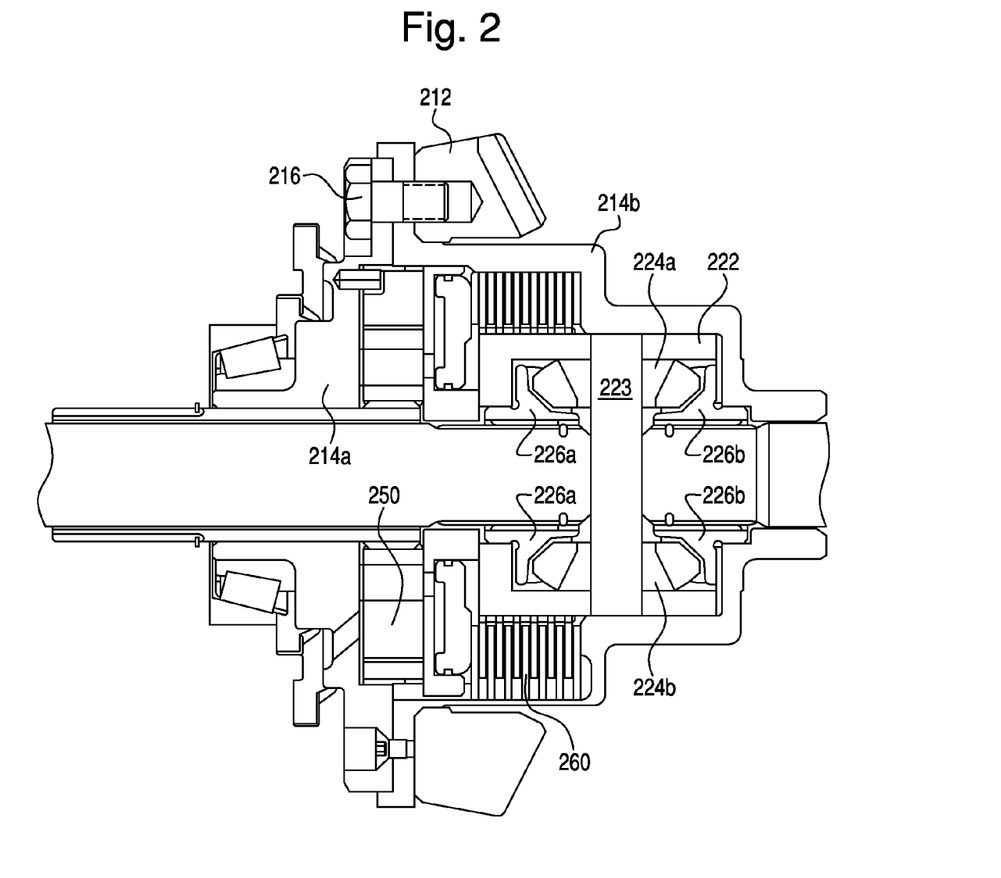
FIG. 2 is a cross sectional view of the torque coupling assembly according to a preferred embodiment of this invention.
Figure 3:
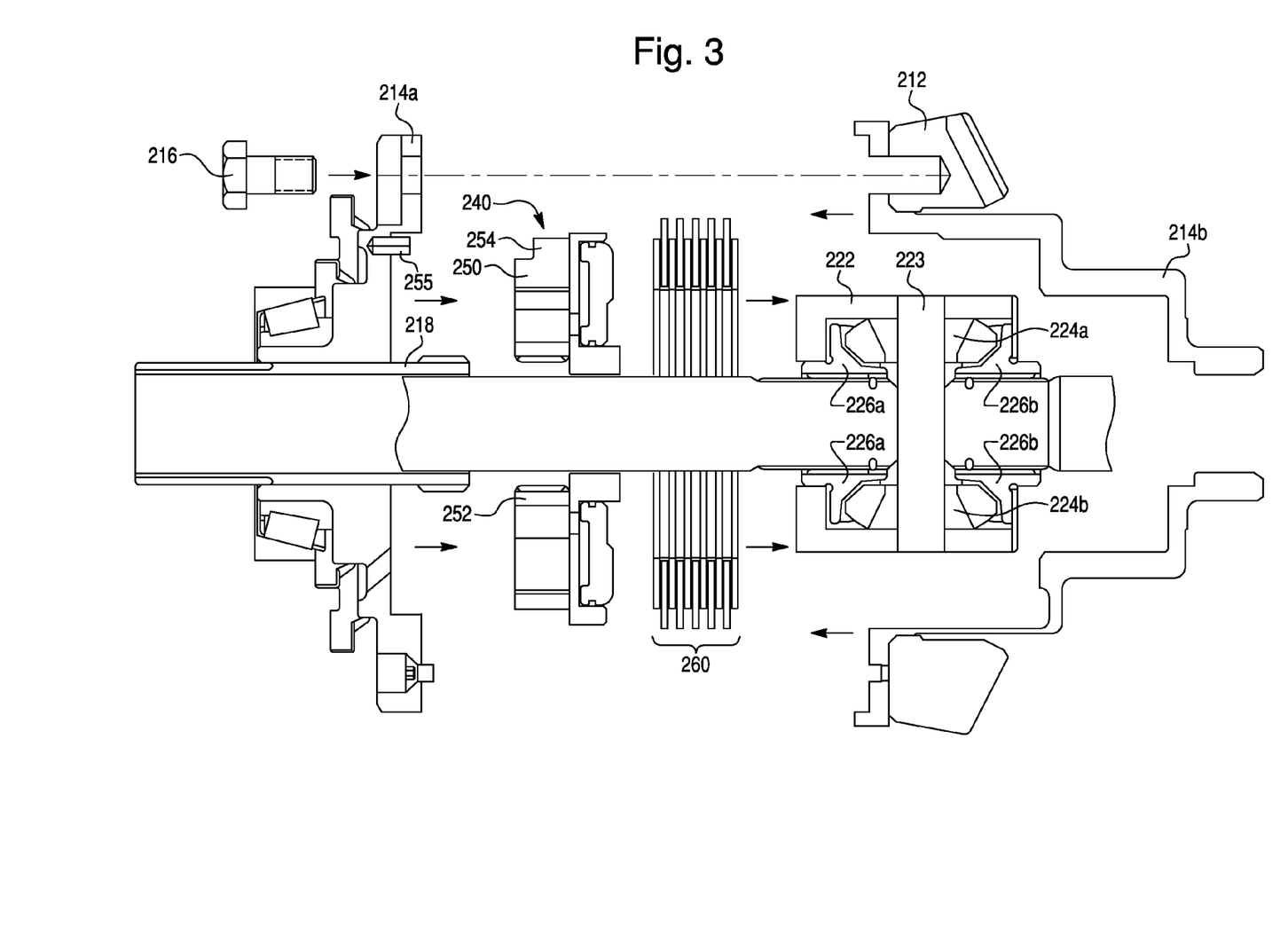
FIG. 3 is an exploded cross sectional view of the torque coupling assembly of FIG. 2.

FIG. 2 is a cross sectional view of the torque coupling assembly according to a preferred embodiment of this invention. FIG. 3 is an exploded cross sectional view of the torque coupling assembly of FIG. 2.

With reference to FIGS. 2 and 3, the torque coupling assembly 200 comprises a ring gear sub-assembly, a differential sub-assembly, and a bearing sub-assembly. The ring gear subassembly includes a ring gear 212 fastened to a side case member 214a, 214b via fasteners 216. While FIG. 3 shows fasteners 216 in the form of bolts fixing the ring gear 212 to the side case member 214a, 214b, it will be understood that various fastening assemblies may be employed without departing from the objectives of this invention. The differential sub-assembly comprises a differential case 222, a pinion shaft 223 driven by the differential case 222, pinions 224a, 224b rotatably attached to the peripheral surface of the pinion shaft 223, and side gears 226a, 226b engaged with the pinions 224a, 224b. The side gears 226a, 226b drive the right and left axles shown in FIGS. 2 and 3.

Interposed between the ring gear sub-assembly and the differential sub-assembly is a bearing assembly which permits relative rotation between the ring gear sub-assembly and the differential sub-assembly.

Further provided between the ring gear sub-assembly and the differential sub-assembly is a speed-sensitive torque coupling assembly, shown generally as assembly 240 in FIG. 3. The speed-sensitive torque coupling assembly 240 included in the preferred embodiment of the present invention comprises a fluid pump 250 and a clutch pack 260. The fluid pump shown and described herein is a Gerotor type pump of the automatically reversible unidirectional flow type. Of course, other types of hydraulic pumps may likewise be employed.

Notably, the Gerotor pump of this invention is drivingly connected to the side case member 214a and a hollow rotatable sleeve shaft 218 rotatably disposed about one of the output axle shaft. The rotor 252 of the Gerotor pump is drivingly connected to the sleeve shaft 218 though splines (see FIG. 3), while the stator 254 of the Gerotor pump is fastened to the side case member 214a though a pin 255 or other suitable mechanical connection.

With the assembly of FIG. 2, a torque coupling assembly is provided within one of the front and rear the axle differential case assemblies; instead of midstream of the front and rear differential assemblies. When the rotation speed of the wheels driven by the first differential 140 is higher than that of the wheels driven by the second differential 170, a rotation speed difference takes place. However, the Gerotor pump 250 is not automatically actuated by this rotational speed difference. Instead, this invention uses a control system external to the fluid pump 250 and clutch pack 260 to control rotation of the fluid pump 250 and subsequent actuation of the clutch pack 260.

The control system for the fluid pump 250 acts on the sleeve shaft 218 to regulate the relative rotation of the rotor 252 and stator 254 from a position that is external to the differential assembly (e.g., external to the ring gear sub-assembly, a differential sub-assembly; or external the differential case for a conventional differential).

Figure 4:
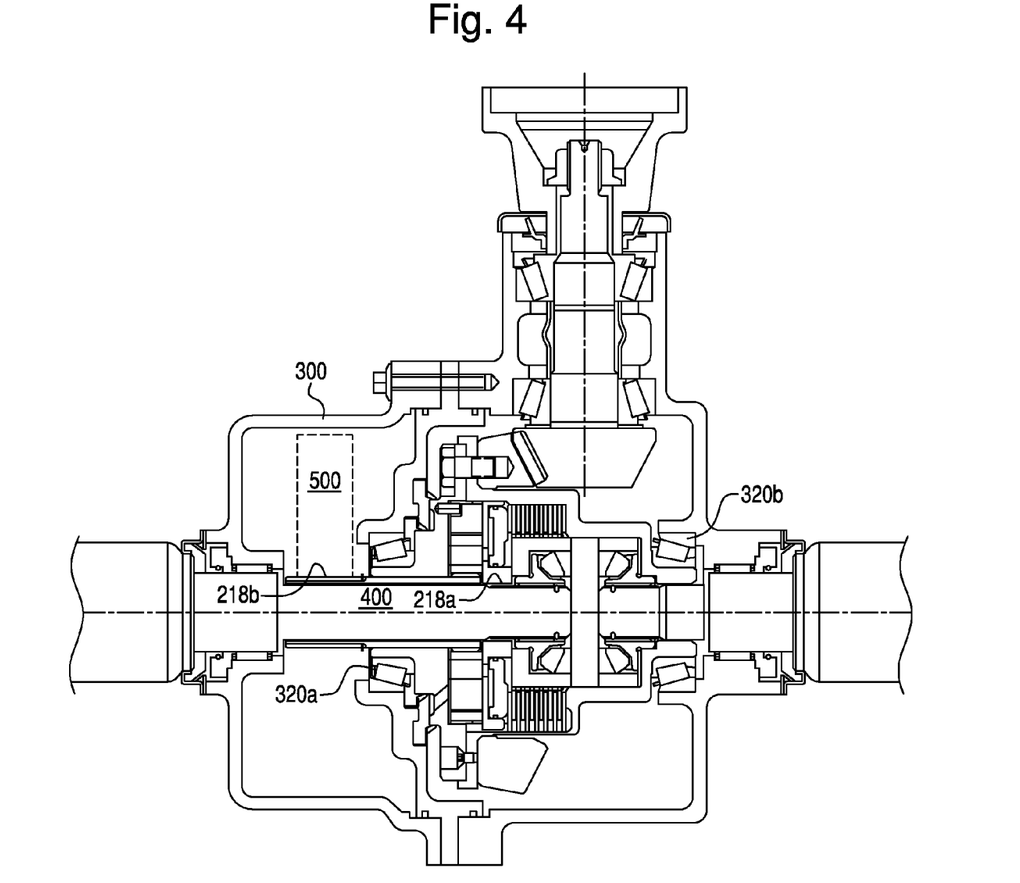
FIG. 4 shows the differential assembly of FIGS. 2 and 3 rotatably mounted within a differential carrier supporting the differential assembly through suitable bearings.

FIG. 4 shows the differential assembly of FIGS. 2 and 3 rotatably mounted within a differential carrier 300 supporting the differential assembly through suitable bearings 320a, 320b. With the embodiment of FIG. 4, the hollow sleeve shaft 218 is provided with splines 218a threadedly connected to the inner rotor 252 of the gerotor pump housed inside the torque coupling housing. The other end 218b of the hollow shaft 218 projects out of the case members 214a, 214b. The hollow sleeve shaft 218 is adapted to rotate relative to the axle shaft 400; therefore the rotation of the inner rotor 252 is independent of the speed of the axle shaft 400 and is controlled by the relative rotation of the shaft 218 and axle shaft 400.

The hydraulically actuated torque coupling is driven by an external control means 500 which is shown schematically because the control means 500 may take many forms as would be known by those of skill in the art. For example, the control means may take the form of an electric motor; a friction brake; a friction pilot clutch; a friction mechanism utilizing magneto-rheological fluid; a magnetic powder clutch; an electromagnetic brake. All of these mechanisms are to be designed to control the relative rotation between the sleeve shaft 218 and the stationary carrier 300.

Figure 5:
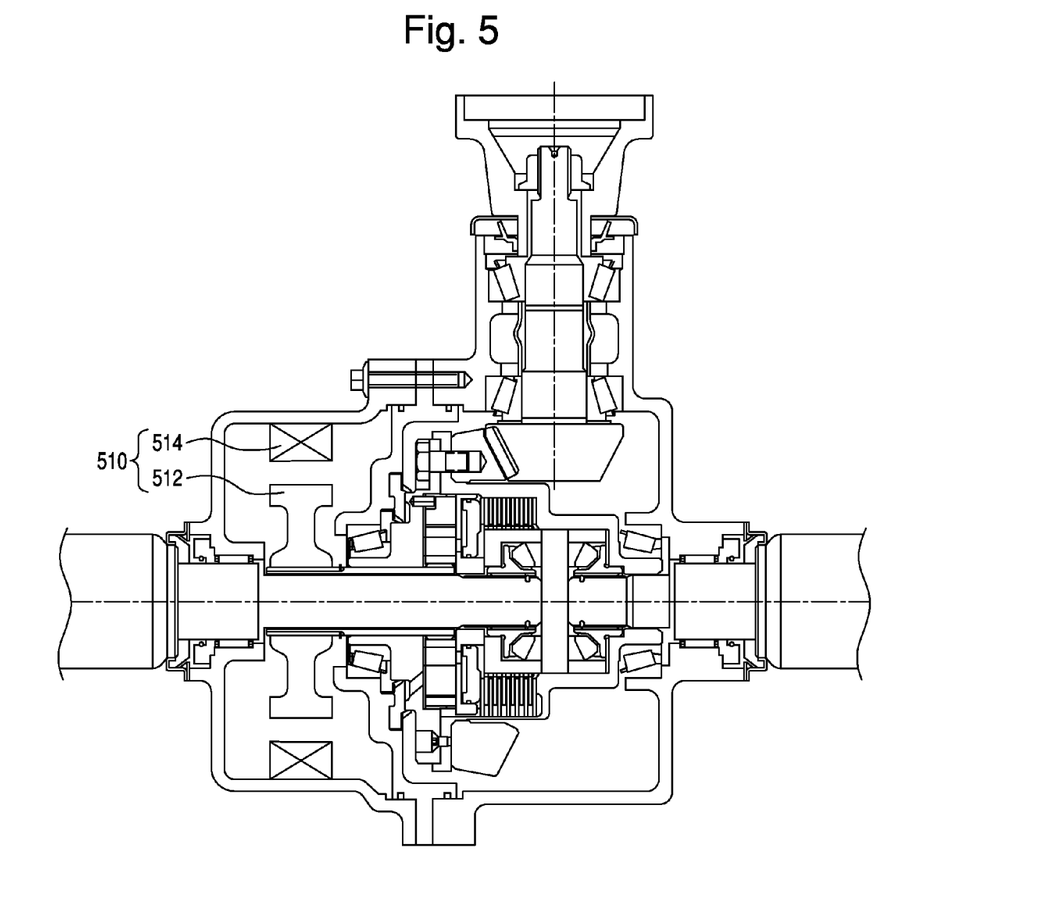
FIG. 5 shows the external control means in the form of a servo-actuated brake mechanism.

By way of example, FIG. 5 shows the external control means in the form of a servo-actuated brake mechanism 510 defined by a rotor 512 and a control ring 514, whereby the control ring 514 controls rotation of the rotor 512 relative to the carrier 300.

Figure 6:
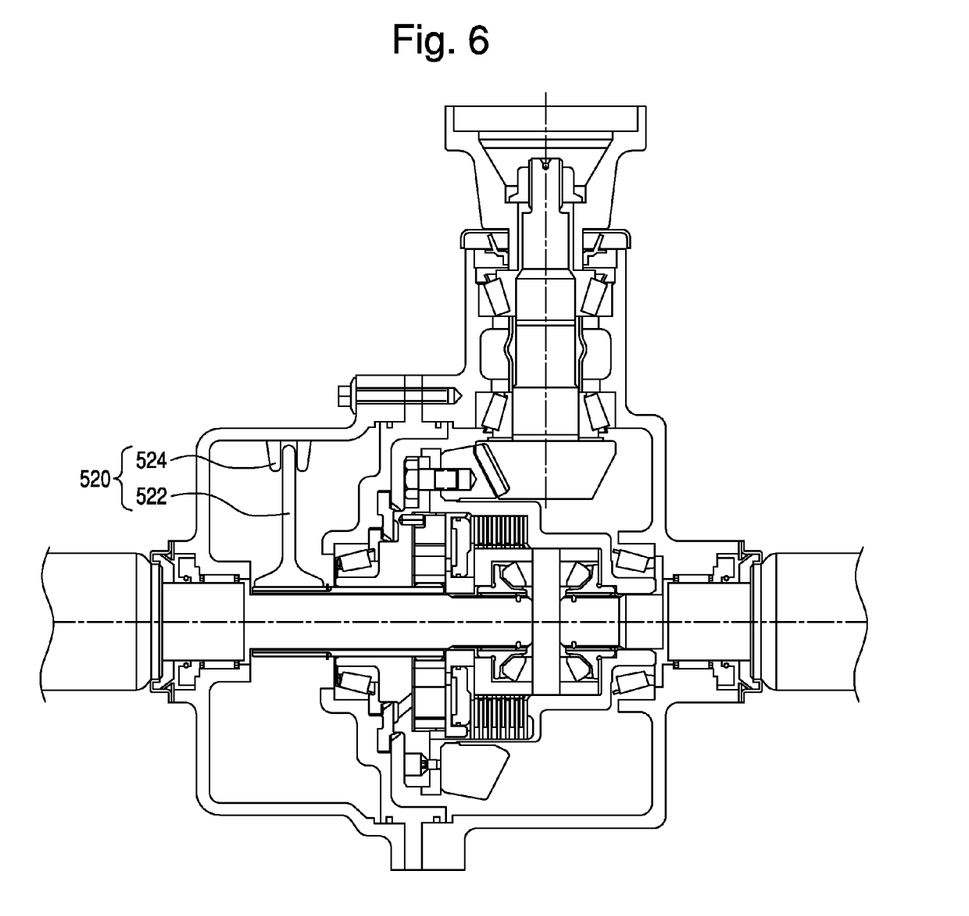
FIG. 6 shows the external control means in the form of a friction brake/clutch mechanism.

Similarly, by way of example, FIG. 6 shows the external control means in the form of a friction brake/clutch mechanism 520 defined by a brake/clutch plate 522 which is splined to the outer end 218b of the sleeve shaft 218. The friction clutch/brake mechanism 520 selectively limits rotation and/or locks the plate 522 and sleeve shaft 218 to the carrier 300 by the control plates 524 which may be manually or electrically moved relative to the plate 522 in a manner known to those of skill in the art.

Figure 7:
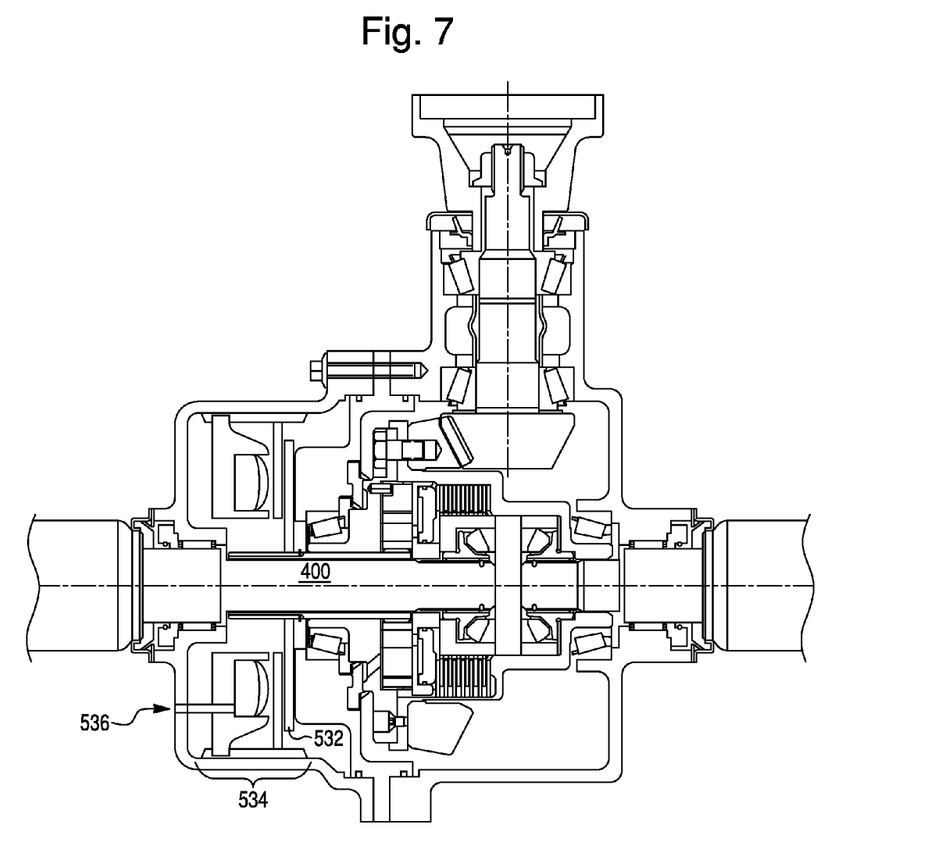
FIG. 7 shows an alternate embodiment where the external control means is formed as a hydraulic clutch arrangement.

FIG. 7 shows an alternate embodiment where the external control means is formed as a hydraulic clutch arrangement 530 comprising a clutch plate 532 and hydraulic piston actuator 534 for selectively locking/regulating rotation of the clutch plate 532 and sleeve shaft 218 with respect to the carrier 300. A pressure source 536 provides hydraulic fluid to selectively actuate the piston actuator 534.

Based on the foregoing description and associated drawings, it will be apparent to those of skill in the art that the invention is directed to a torque-coupling device comprising a hydraulically actuated friction clutch pack and a gerotor pump provided for generating hydraulic pressure actuating the friction clutch pack. The gerotor pump is selectively actuated by a device external to the gerotor pump and the friction clutch pack, such as an electric motor, friction brake, electromagnetic clutch, friction mechanism utilizing a magneto-rheological fluid, electromagnetic brake, etc. The externally driven gerotor pump may be further provided with torque-multiplication gearing, and/or an electronic controller using sensors to modulate the actuation of the pump in order to provide flexible control of the hydraulic pressure generated by the gerotor pump. The present invention also envisages the combination of the torque-coupling device with the externally driven gerotor pump and a solenoid controlled variable pressure relief system, as described in U.S. Pat. Nos. 6,699,151 and 6,692,396, which are hereby incorporated by reference.

While the foregoing invention has been shown and described with reference to the preferred embodiments described above, it will be understood by those of skill in the art that various changes in form and detail may be made without departing from the spirit and scope of this invention.

The invention claimed is:

1. A torque coupling unit comprising:
an input member and at least one output member;
a clutch assembly for selectively coupling said input member with said at least one output member;
a normally deactivated hydraulic pump provided to generate a hydraulic pressure to frictionally load said clutch assembly; and
a pump actuator for selectively actuating said hydraulic pump, said pump actuator disposed externally to said clutch assembly;
said hydraulic pump being drivingly disconnected from said at least one output member both when actuated and deactivated by said pump actuator.

2. The torque coupling unit according to claim 1, wherein said clutch assembly and said hydraulic pump are disposed within a rotating case and said pump actuator is disposed outside said rotating case.

3. The torque coupling unit according to claim 2, wherein said rotating case is a differential case housing a differential mechanism receiving torque from said input member and delivering torque to two output members.

4. A torque coupling unit comprising:
an input member and at least one output member;
a clutch assembly for selectively coupling said input member with said at least one output member;
a normally deactivated hydraulic pump provided to generate a hydraulic pressure to frictionally load said clutch assembly; and
a pump actuator for selectively actuating said hydraulic pump, said pump actuator disposed externally to said clutch assembly;
said clutch assembly and said hydraulic pump being disposed within a rotating case and said pump actuator is disposed outside said rotating case;
said hydraulic pump comprising a rotor and a stator, and wherein said stator being drivingly coupled to said rotating case and said rotor being drivingly coupled to said pump actuator disposed outside said rotating case.

5. The torque coupling unit according to claim 4, further comprising a rotatable sleeve shaft coaxial with said at least one output member and drivingly coupling said rotor to said pump actuator.

6. The torque coupling unit according to claim 5, wherein said pump actuator is a torque coupling device interposed between a stationary housing and said sleeve shaft to control actuation of said hydraulic pump.

7. The torque coupling unit according to claim 6, wherein said torque coupling device controls a rotation of said rotor relative to said stator to control a pump action of said hydraulic pump.

8. The torque transmission coupling according to claim 7, wherein said torque coupling device is one of a brake mechanism and a clutch mechanism.

9. A torque transmission coupling for an axle of a four-wheel-drive vehicle, said torque transmission coupling comprising:
a two-part casing having a first housing and a second housing;
a ring gear secured to and transmitting an input torque to said first housing;
at least one pinion and side gear assembly secured to and receiving an output torque from said second housing;
a multi-disc clutch mechanism adapted to transmit torque from said first housing to said second housing when said multi-disc clutch mechanism is in an engaged position, a first set of clutch plates being secured to said first housing and a second set of clutch plates being secured to said second housing;
a hydraulic pump provided to generate a hydraulic pressure to frictionally load said clutch mechanism;
a pump actuator for selectively actuating said hydraulic pump, said pump actuator disposed externally to said first and second housings;
wherein both said hydraulic pump and said clutch mechanism are disposed between said first and second housings.

10. The torque transmission coupling according to claim 9, wherein said hydraulic pump is responsive to a relative rotation between said first housing and said pump actuator to thereby actuate said multi-disc clutch mechanism.

11. The torque transmission coupling according to claim 9, wherein said hydraulic pump comprises a rotor and a stator, and wherein said stator is drivingly coupled to said first housing and said rotor is drivingly coupled to said pump actuator disposed outside said first housing.

12. The torque transmission coupling according to claim 11, wherein said pump actuator comprises a rotatable sleeve shaft coaxial with said at least one pinion and side gear assembly.

13. The torque transmission coupling according to claim 12, wherein said pump actuator is a torque coupling device interposed between a stationary housing and said sleeve shaft to control actuation of said hydraulic pump.

14. The torque transmission coupling according to claim 13, wherein said torque coupling device controls a rotation of said rotor relative to said stator to control a pump action of said hydraulic pump.

15. The torque transmission coupling according to claim 14, wherein said torque coupling device is one of a brake mechanism and a clutch mechanism.

* * * * *